United States Patent
Schwerdtfeger et al.

(10) Patent No.: US 6,829,746 B1
(45) Date of Patent: Dec. 7, 2004

(54) ELECTRONIC DOCUMENT DELIVERY SYSTEM EMPLOYING DISTRIBUTED DOCUMENT OBJECT MODEL (DOM) BASED TRANSCODING

(75) Inventors: Richard S. Schwerdtfeger, Round Rock, TX (US); Lawrence F. Weiss, Round Rock, TX (US); Rabindranath Dutta, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/458,646

(22) Filed: Dec. 9, 1999

(51) Int. Cl.$^7$ ................................................ G06F 17/00
(52) U.S. Cl. ........................ 715/523; 715/513; 704/271
(58) Field of Search ............................. 715/523, 501.1, 715/513; 704/271

(56) References Cited

U.S. PATENT DOCUMENTS

| | | | |
|---|---|---|---|
| 5,537,526 A | | 7/1996 | Anderson et al. |
| 5,748,186 A | | 5/1998 | Raman |
| 5,754,173 A | | 5/1998 | Hiura et al. |
| 5,850,520 A | | 12/1998 | Griebenow et al. |
| 5,918,013 A | * | 6/1999 | Mighdoll et al. ............ 709/217 |
| 5,987,256 A | * | 11/1999 | Wu et al. .................... 717/146 |

(List continued on next page.)

FOREIGN PATENT DOCUMENTS

| | | |
|---|---|---|
| EP | 0 947 931 | 10/1999 |
| EP | 1 079 311 | 2/2001 |
| EP | 1 126 380 | 8/2001 |

OTHER PUBLICATIONS

Hadjadj et al., "Making the Internet Accessibile to the Visually Handicapped," RESNA '98m Jun. 1998.*

(List continued on next page.)

*Primary Examiner*—Stephen S. Hong
*Assistant Examiner*—Adam Queler
(74) *Attorney, Agent, or Firm*—Kevin L. Daffer; Conley Rose P.C.; Marilyn S. Dawkins, IBM (57) ABSTRACT

Several different embodiments of an electronic document delivery system are described including a client machine (e.g., a palmtop/handheld computer or wireless communication device) coupled to a transcoder proxy. The system allows a client machine with limited resources to provide interactive aspects of electronic documents such as Web pages and/or an assistive technology solution for a physically challenged user. The transcoder proxy receives an electronic document including one or more elements and expressed in a first digital format (e.g., HTML or XML). The transcoder proxy assigns a unique identifier to each element, produces an "original" script including at least a portion of the document expressed in a second digital format (e.g., a scripting language), and provides the original script to the client machine. The transcoder proxy may form a model of the document (e.g., a document object model or DOM), and may use the model to produce the original script. The client machine uses the original script to display or otherwise present the portion of the document. The client machine generates an event in response to user input, associates the event with an element within the original script, and provides the event and the identifier assigned to the element to the transcoder proxy. The transcoder proxy accesses the model using the identifier, uses the model to produce a "modification" script, and provides the modification script to the client machine. The client machine uses the modification script to modify the displayed or otherwise presented portion of the document.

30 Claims, 5 Drawing Sheets

U.S. PATENT DOCUMENTS

| | | | | |
|---|---|---|---|---|
| 5,996,022 A | * | 11/1999 | Krueger et al. | 709/247 |
| 6,115,482 A | * | 9/2000 | Sears et al. | 382/114 |
| 6,161,126 A | * | 12/2000 | Wies et al. | 709/203 |
| 6,311,215 B1 | * | 10/2001 | Bakshi et al. | 709/221 |
| 6,401,132 B1 | * | 6/2002 | Bellwood et al. | 709/246 |
| 6,405,240 B1 | * | 6/2002 | Tsubone et al. | 709/203 |
| 6,421,733 B1 | * | 7/2002 | Tso et al. | 709/246 |
| 6,510,469 B1 | * | 1/2003 | Starnes et al. | 709/247 |
| 6,535,896 B2 | * | 3/2003 | Britton et al. | 715/523 |
| 6,681,370 B2 | * | 1/2004 | Gounares et al. | 715/513 |

OTHER PUBLICATIONS

Kieninger et al., "Hyperbraille—A Hypertext System for the Blind," ASSETS '94, 10/94.*

Mazzocchi, Extensible Server Pages (XSP) Layer 1, Jun. 11, 1999, http://xml.coverpages.org/WD–xsp–19990611.html.*

Search Report, application No. GB 0028751.6, mailed Nov. 9, 2001.

* cited by examiner

ELECTRONIC DOCUMENT DELIVERY SYSTEM EMPLOYING DISTRIBUTED DOCUMENT OBJECT MODEL (DOM) BASED TRANSCODING

CROSS-REFERENCE TO RELATED APPLICATION

This application relates to two co-pending applications, Ser. Nos. 09/458,642 and 09/458,648, filed on the same day as the present application and entitled "ELECTRONIC DOCUMENT DELIVERY SYSTEM EMPLOYING DISTRIBUTED DOCUMENT OBJECT MODEL (DOM) BASED TRANSCODING AND PROVIDING INTERACTIVE JAVASCRIPT SUPPORT" and "ELECTRONIC DOCUMENT DELIVERY SYSTEM EMPLOYING DISTRIBUTED DOCUMENT OBJECT MODEL (DOM) BASED TRANSCODING AND PROVIDING ASSISTIVE TECHNOLOGY SUPPORT" by Richard S. Schwerdtfeger, Lawrence F. Weiss, and Rabindranath Dutta.

BACKGROUND OF THE INVENTION

1. Field of the Invention

This invention relates to systems for providing electronic documents, and more particularly to document delivery systems wherein servers transcode documents delivered to client machines.

2. Description of Related Art

The World Wide Web, known simply as the "Web", is a network of Internet servers that provide specially formatted electronic documents to various "client" machines. Web servers currently support documents formatted in a text-based markup language called hypertext markup language (HTML).

In order to provide Web access to client machines with limited capabilities (e.g., palmtop or handheld computers), a "transcoder proxy" is typically positioned between the client machine and an Internet server. The transcoder proxy may, for example, provide selected portions of a requested Web document to the client machine based upon the capabilities of the client machine. In doing so, the transcoder proxy may translate one or more selected portions of the Web document from one digital format to another.

Figure 1:
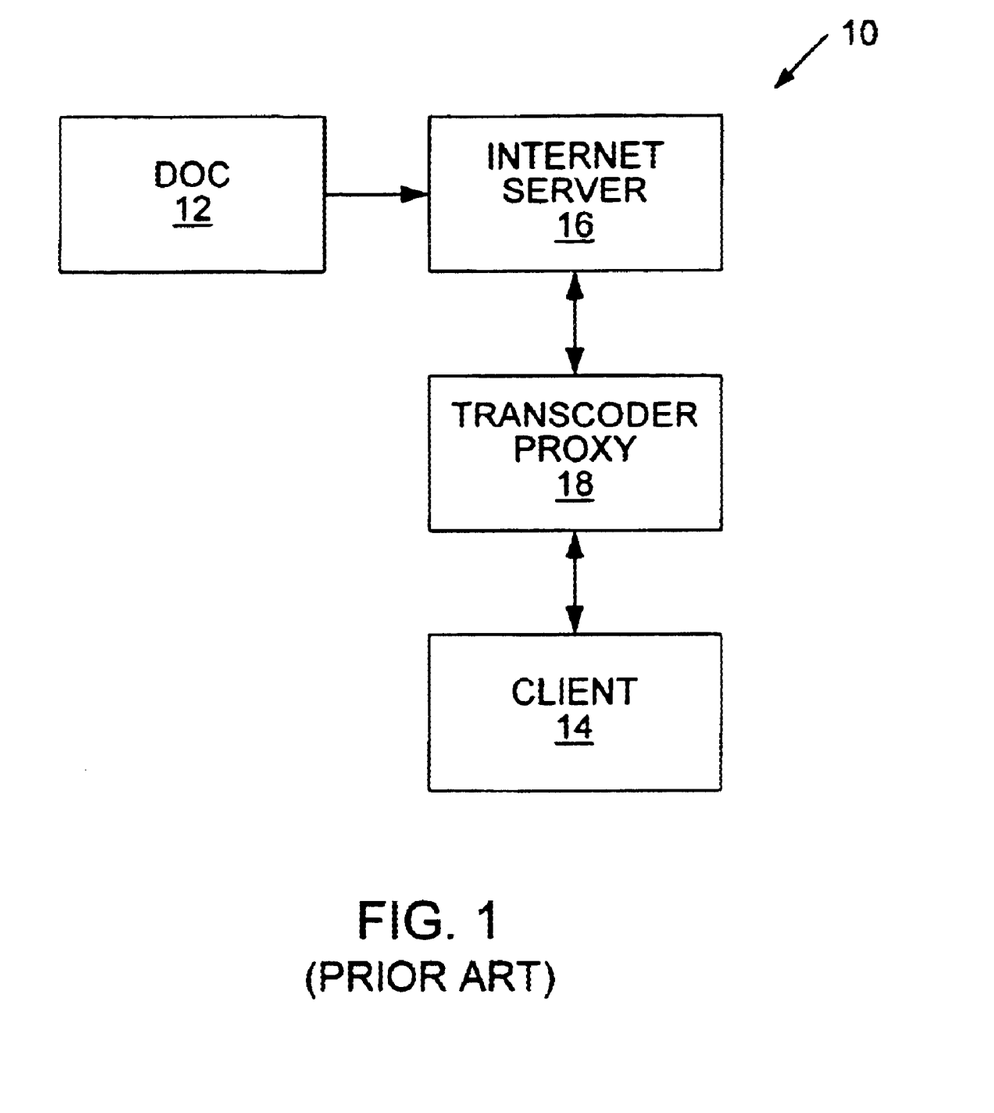
FIG. 1 is a block diagram of a representative system currently used to provide an electronic document (e.g., a Web page) to a client machine with limited capabilities.

FIG. 1 is a block diagram of a representative system 10 currently used to provide an electronic document 12 (e.g., a Web page) to a client machine 14 with limited capabilities. Client machine 14 may be, for example, a palmtop or handheld computer with limited memory, processing capability, and/or display capability. System 10 includes an internet server 16, and a transcoder proxy 18 interposed between client machine 14 and internet server 16. Transcoder proxy 18 forwards a request for document 12 from client machine 14 to internet server 16. Such a request typically includes a uniform resource locator (URL) of document 12 specifying the internet protocol (IP) address of document 12 and the name of the file containing document 12.

Internet server 16 fetches document 12 and provides document 12 to transcoder proxy 18. Based upon the capabilities of client machine 14, transcoder proxy 18 may translate or "transcode" one or more selected portions of document 12 from one digital format to another. For example, transcoder proxy 18 may transcode a portion of document 12 from HTML to a script written in a scripting language understood by a Web browser application program running within client machine 14. The Web browser program may use information conveyed by the script to present the one or more selected portions of document 12 upon a display device of client machine 14.

Alternately, client machine 14 may include a text-to-speech converter, and the information conveyed by the script may be used to output the one or more selected portions of document 12 as speech through a speaker of client machine 14. The term "assistive technology" is used herein to describe technology that helps physically challenged individuals access to a computer system (e.g., client machine 14). Well known types of assistive technologies include "screen readers" which convert display information to speech, "screen magnifiers" which enlarge features of portions of display screen contents, and voice recognition software which converts speech to a digital representation of text or commands.

Computer language code or "script" which modifies visual presentations of electronic documents in response to user input is increasingly being included within electronic documents. Such interactive aspects of electronic documents are used to provide, for example, Web site navigation information in response to user input. JAVASCRIPT (™ Netscape Comm. Corp., Mountain View, Calif.) is a well known cross-platform, object-based scripting language for client and server applications. JAVASCRIPT is commonly used to add interactive aspects to electronic documents such as Webpages.

The Document Object Model (DOM) is an application programming interface (API) for "documents". The World Wide Web Consortium (W3C) has authored a DOM specification available on the Web at URL http://www.w3.org/. The DOM defines the logical structure of documents and the way a document is accessed and manipulated. In the DOM specification, the term "document" is used in the broad sense. Increasingly, XML is being used as a way of representing many different kinds of information that may be stored in diverse systems. Much of this information would traditionally be seen as data rather than as documents.

In the DOM, documents have a logical structure which is very much like a tree. To be more precise, the logical structure is like a "forest" or "grove", which can contain more than one tree. However, the DOM specification does not require that documents be implemented as a tree or a grove, nor does it specify how the relationships among objects be implemented. The DOM is a logical model that may be implemented in any convenient manner. In the DOM specification, the term "structure model" is used to describe the tree-like representation of a document. Terms like "tree" or "grove" are not used to avoid implying a particular implementation. One important property of DOM structure models is structural isomorphism. If any two DOM implementations are used to create a representation of the same document, they will create the same structure model, with precisely the same objects and relationships.

In current document delivery systems, a problem arises in that many client machines do not support interactive aspects of electronic documents such as Web pages due to resource limitations. As a result, transcoding proxy 18 may be configured to remove any computer language code or script within the one or more selected portions of an electronic document provided to client machine 14. Web site navigation capability may be lost, and with it the ability to access Web site information. Additionally, a client machine may not have sufficient resources to provide an assistive technology solution for a physically challenged user.

It would thus be desirable to have an electronic document delivery system which allows a client machine with limited resources to provide interactive aspects of electronic documents such as Web pages and/or an assistive technology solution for a physically challenged user. The desired document delivery system may use the document object model (DOM) to define a logical structure of an electronic document, and to access and manipulate the electronic document.

SUMMARY OF THE INVENTION

Several different embodiments of an electronic document delivery system are described including a client machine coupled to (i.e., in wired or wireless communication with) a transcoder proxy. The client machine may be, for example, a palmtop or handheld computer or a wireless communication device with limited display, memory, and/or processing capability. The transcoder proxy is coupled to receive electronic documents. Each electronic document includes one or more elements, and is expressed in a first digital format (e.g., a text-based markup language such as HTML or XML). The transcoder proxy assigns a unique identifier to each element of the electronic document. The transcoder proxy produces an "original" script including at least a portion of the electronic document expressed in a second digital format (e.g., a scripting language). The original script includes the elements within the portion of the electronic document, as well as the identifiers assigned to the elements. The transcoder proxy provides the original script to the client machine.

The transcoder proxy may form a model of a logical structure of the electronic document. The model may also define methods for accessing and manipulating the document. The model may be, for example, a document object model (DOM). The transcoder proxy may use the model to produce the original script. The transcoder proxy may save the model, including the elements of the electronic document, and the identifiers assigned to the elements for future use.

The client machine receives the original script from the transcoder proxy, and uses the original script to display or otherwise present the portion of the electronic document. The client machine also generates events in response to user input. The client machine associates an event with an element within the original script. The client machine provides the event and the identifier assigned to the element associated with the event to the transcoder proxy.

The transcoder proxy stores the model, including the elements of the electronic document, and the identifiers assigned to the elements. The elements of the electronic document may be associated with corresponding identifiers within the model. In response to the event and the identifier received from the client machine, the transcoder proxy accesses the model using the identifier. The transcoder proxy may modify the model. Following any modification of the model, the transcoder proxy uses the model to produce a "modification" script, wherein the modification script differs from the original script. The transcoder proxy provides the modification script to the client machine. The client machine receives the modification script, and uses the modification script to modify the displayed or otherwise presented portion of the electronic document.

One embodiment of the transcoder proxy includes a synchronous document object model (DOM) generator coupled to a transcoder and a user interface generator. The synchronous (DOM) generator is coupled to receive the electronic document, and includes an identifier (ID) generator for assigning a unique identifier to each element of the electronic document. The synchronous DOM generator forms a pre-transcoded DOM representing the logical structure of the electronic document. The pre-transcoded DOM may also define methods for accessing and manipulating the document. Within the pre-transcoded DOM, document elements are associated with corresponding identifiers. The synchronous DOM generator provides a first portion of the electronic document to the transcoder in the first digital format.

The transcoder receives the first portion of the electronic document, and translates the first portion of the electronic document from the first digital format, thereby producing the original script in a second digital format (e.g., a scripting language). As described above, the original script includes the elements within the first portion of the electronic document and the identifiers assigned to the elements. The transcoder provides the original script (e.g., to a client machine coupled to the transcoder).

The user interface generator receives an event and the associated identifier (e.g., from a client machine coupled to the user interface generator). The user interface generator may use the event and the associated identifier to produce DOM access commands, and may provide the DOM access commands to the synchronous DOM generator. In this case, the synchronous DOM generator accesses the pre-transcoded DOM using the DOM access commands. The synchronous DOM generator may modify the pre-transcoded DOM in response to the DOM access commands. Following any modification of the pre-transcoded DOM, the synchronous DOM generator provides a second portion of the electronic document to the transcoder in the first digital format.

The transcoder receives the second portion of the electronic document, and translates the second portion of the electronic document from the first digital format, thereby producing a modification script in the second digital format. The transcoder provides the modification script (e.g., to the client machine).

One embodiment of the client machine includes a user agent coupled to an output device. The output device may be, for example, a display device for visual presentation. Alternately, the output device may be a text-to-speech converter for audible presentation. The user agent is also adapted for coupling to the transcoder proxy. The user agent receives the original script from the transcoder proxy, and forms a transcoded DOM in response to the original script. The transcoded DOM is a representation of the first portion of the electronic document. The user agent uses the transcoded DOM to produce output commands, and provides the output commands to the output device.

In response to user input, the user agent generates an event. The user agent associates the event with an element within the original script. The user agent provides the event and the identifier assigned to the element associated with the event to the transcoder proxy. The user agent receives the modification script from the transcoder proxy, and modifies the transcoded DOM in response to the modification script. As a result, the portion of the electronic document displayed or otherwise presented by the output device is modified.

A method for transcoding an electronic document, which may be embodied within the transcoder proxy, includes receiving the electronic document in a first digital format (e.g., a text-based markup language such as HTML or XML). A unique identifier is assigned to each element of the electronic document. A model of a logical structure of the electronic document is formed. The model may also define methods for accessing and manipulating the document. The model may be, for example, a document object model (DOM). The model includes the identifier assigned to each element. The model is used to produce a script, wherein the script includes at least a portion of the document expressed in a second digital format (e.g., a scripting language). The script includes at least one element, and the identifier assigned to the element. The script is provided (e.g., to a client machine).

A first method for presenting an electronic document, which may be embodied within the transcoder proxy, includes the above transcoding method, wherein the script produced using the transcoding method is an original script. The presentation method further includes receiving an event and an identifier associated with the event (e.g., from a client machine). The model is accessed using the identifier associated with the event, and may be modified. Following any modification, the model is used to produce a modification script, wherein the modification script differs from the original script. The modification script is provided (e.g., to the client machine).

A second method for presenting a electronic document, which may be embodied within the client machine, includes receiving an original script (e.g., from a transcoder proxy), wherein the original script includes at least a portion of the electronic document expressed in a digital format (e.g., a scripting language). The original script is used to present the portion of the electronic document. An event is generated in response to user input. The event is associated with an element within the original script. The event and the identifier assigned to the element are provided (e.g., to the transcoder proxy) in response to the event. A modification script is received (e.g., from the transcoder proxy), wherein the modification script differs from the original script. The modification script is used to modify the presented portion of the electronic document.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 2:
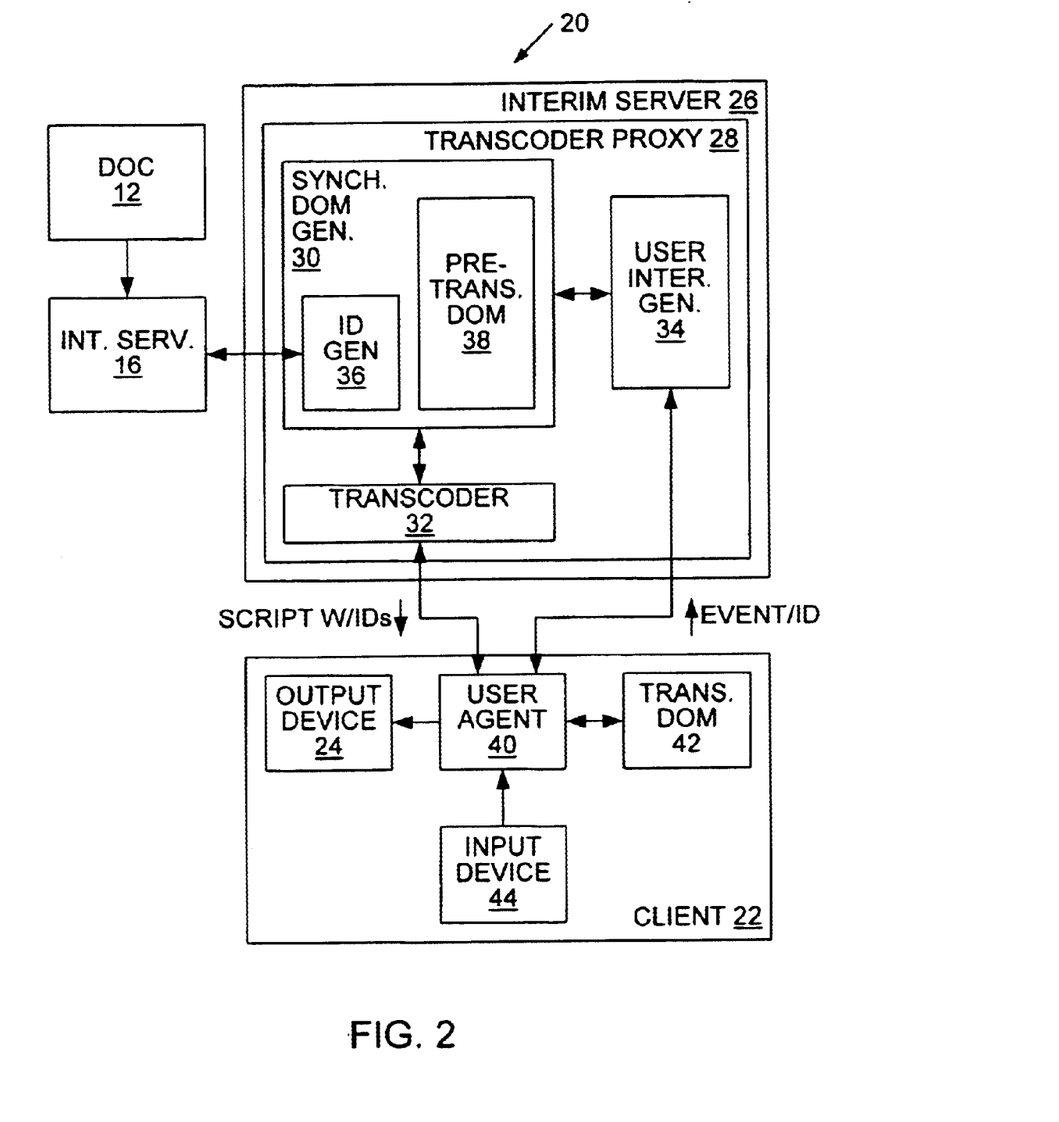
FIG. 2 is a block diagram of a first embodiment of a system for providing an electronic document (e.g. a Web page) to a client machine.

FIG. 2 is a block diagram of a first embodiment of a system 20 for providing electronic document 12 (e.g., a Web page) to a client machine 22. In the embodiment of FIG. 2, client machine 22 includes an output device 24. Output device 24 may include a relatively small display device with limited display capabilities. Output device 24 may also include a speaker for producing speech. Client machine 22 may be, for example, a palmtop or handheld computer or a wireless communication device with limited memory and/or processing capability.

In the embodiment of FIG. 2, system 20 includes internet server 16 and an interim server 26 coupled between client machine 22 and internet server 16. Interim server 26 includes a transcoder proxy 28. Transcoder proxy 28 forwards electronic document requests from client machine 22 to internet server 16. Transcoder proxy 28 receives electronic documents (e.g., document 12) from internet server 16 in digital format. Well known digital formats include text-based markup language formats such as hypertext markup language (HTML) and extensible markup language (XML). Other common digital formats include POSTSCRIPT (™ Adobe Sys. Inc., San Jose, Calif.), portable document format (PDF), and advanced function printing (AFP). Transcoder proxy 28 includes a synchronous document object model (DOM) generator 30 coupled to a transcoder 32 and a user interface generator 34. Synchronous DOM generator 30 receives electronic documents from internet server 16, and includes an identifier (ID) generator 36.

In response to electronic document 12 provided by interim server 16, synchronous DOM generator produces a pre-transcoded DOM 38. Electronic document 12 includes one or more elements representing document structures. Examples of document elements include paragraphs, hypertext links, lists, tables, and images. ID generator 36 assigns a unique identifier to each element of electronic document 12. Pre-transcoded DOM 38 defines a tree-like logical structure of document 12, and also defines methods for accessing and manipulating document 12. Within pre-transcoded DOM 38, elements of electronic document 12 are associated with their identifiers. As will be described in more detail below, pre-transcoded DOM 38 facilitates navigation of the logical structure of electronic document 12. Pre-transcoded DOM 38 preferably complies with the World Wide Web Consortium (W3C) DOM specification available on the Web at URL http://www.w3.org/.

Synchronous DOM generator 30 provides at least a portion (e.g., a first portion) of document 12 to be displayed or otherwise presented to the user by client machine 22 to transcoder 32. Transcoder 32 translates the first portion of document 12 from one digital format to another. For example, transcoder 32 may translate the first portion of document 12 from a first digital format (e.g., HTML) to a script expressed in a second digital format (e.g., a scripting language understood by a user agent 40 within client machine 22).

The scripting language may be, for example, a subset of the digital format in which transcoder proxy 28 receives document 12 from internet server 16 (e.g., a subset of HTML, XML, POSTSCRIPT, PDF, or AFP). In producing the script, transcoder proxy 28 may covert graphics images within electronic document 12 from one format to another (e.g., from joint photographic experts group/JPEG format to graphics interchange format/GIF format, from JPEG and GIF formats to scaled vector graphics/SVG format, etc.). The script may also include audio data files (e.g., wav files), transcoded Braille, and/or unformatted text.

Transcoder 32 provides the produced "original" script to user agent 40 of client machine 22. The original script includes a description of the elements within the first portion of document 12. The original script also includes the identifiers assigned to the elements within the first portion of document 12.

In response to the received original script, user agent 40 of client machine 22 produces a transcoded DOM 42. Transcoded DOM 42 contains a representation of the elements of the first portion of document 12 to be displayed or otherwise presented via output device 24. Within transcoded DOM 42, elements of the portion of document 12 are associated with their identifiers. User agent 40 uses transcoded DOM 42 to issue output commands to output device 24. As described above, output device 24 may include a relatively small display device with limited display capabilities. Output device 24 may also include a speaker for producing speech.

Client machine 22 also includes an input device 44 coupled to user agent 40. Input device 44 may be, for example, one or more keys or buttons, a pointing device such as a mouse, or a speech-to-text converter. The speech-to-text converter may, for example, be the input device of choice for a physically challenged user (e.g., a permanently or temporarily disabled user who cannot operate a conventional input device such as a mouse or a keyboard due to a disability). A user input via input device 44 may cause user agent 40 to generate an event. User agent 40 associates an event with an element and the identifier assigned to the element. User agent 40 provides an event and the identifier assigned to the event to user interface generator 34 within transcoder proxy 28.

It is noted that client machine 22 may include other input, output, and/or input/output (I/O) devices not shown. It is also noted that input device 44 and output device 24 may be a combined I/O device, such as a speech engine which converts digital signals representing text to speech and also converts speech to digital signals representing text, or a touch screen I/O device which includes a visual display screen and accepts user input via pressure applied to the display screen (e.g., via a stylus).

User interface generator 34 may use the event and the identifier to produce DOM access commands, and may provide the DOM access commands to synchronous DOM generator 30. Synchronous DOM generator may use the DOM access commands to access one or more elements within pre-transcoded DOM 38. Synchronous DOM generator 30 may modify pre-transcoded DOM 38 in response to the DOM access commands.

Alternately, user interface generator 34 may use the identifier to access the one or more elements within pre-transcoded DOM 38. User interface generator 34 may modify pre-transcoded DOM 38 in response to the event and the identifier.

In either case, following any modification of pre-transcoded DOM 38, synchronous DOM generator 30 provides a modified portion (e.g., a second portion) of document 12 to be displayed or otherwise presented to the user by client machine 22 to transcoder 32. Transcoder 32 translates the second portion of document 12 from the first digital format to the second digital format, thereby producing "modification" script. The modification script modifies the first portion of document 12 currently displayed or otherwise presented to the user by client machine 22. The modification script includes a description of the elements within the second portion of document 12, and the identifiers assigned to the elements within the second portion of document 12. In response to the modification script, user agent 40 of client machine 22 modifies transcoded DOM 42 and issues new output commands to output device 24. As a result, the second portion of document 12 is displayed or otherwise presented by output device 24.

For example, input device 44 may be a mouse, and a user may position a cursor or pointer at an edge of a displayed portion of document 12 via the mouse indicating a desire to have an adjacent portion (i.e., a second portion) of document 12 presented. User agent 40 may generate an event in response to such positioning of the cursor or pointer. User agent 40 may associate the event with a displayed element, and may provide the event and the identifier assigned to the element associated with the event to user interface generator 34 within transcoder proxy 28. User interface generator 34 may provide the event and the associated identifier to synchronous DOM generator 30. Synchronous DOM generator 30 uses the identifier to access pre-transcoded DOM 38. As described above, synchronous DOM generator 30 may modify pre-transcoded DOM 38 in response to the event and the associated identifier. Synchronous DOM generator 30 provides the second portion of document 12 to transcoder 32. Transcoder 32 generates modification script which includes a description of the elements and the identifier assigned to each of the elements within the second portion of document 12. In response to the modification script, user agent 40 of client machine 22 modifies transcoded DOM 42 and issues new output commands to output device 24. As a result, the second portion of document 12 is displayed or otherwise presented by output device 24.

It is noted that in the embodiment of FIG. 2, transcoder proxy 28 also serves as a "reverse" proxy. Interaction between transcoder proxy 28 and client 22 is facilitated by the HTTP 1.1 standard which allows the transmission control protocol/internet protocol (TCP/IP) link to remain operational across multiple requests. As a result, frequent and relatively short client-server exchanges may take place without incurring the overhead of re-establishing a connection between interim server 26 and client 22. Interaction between transcoder proxy 28 and client 22 may also be conducted using established mechanisms such as cookies, URL re-writing, etc.

Figure 3:
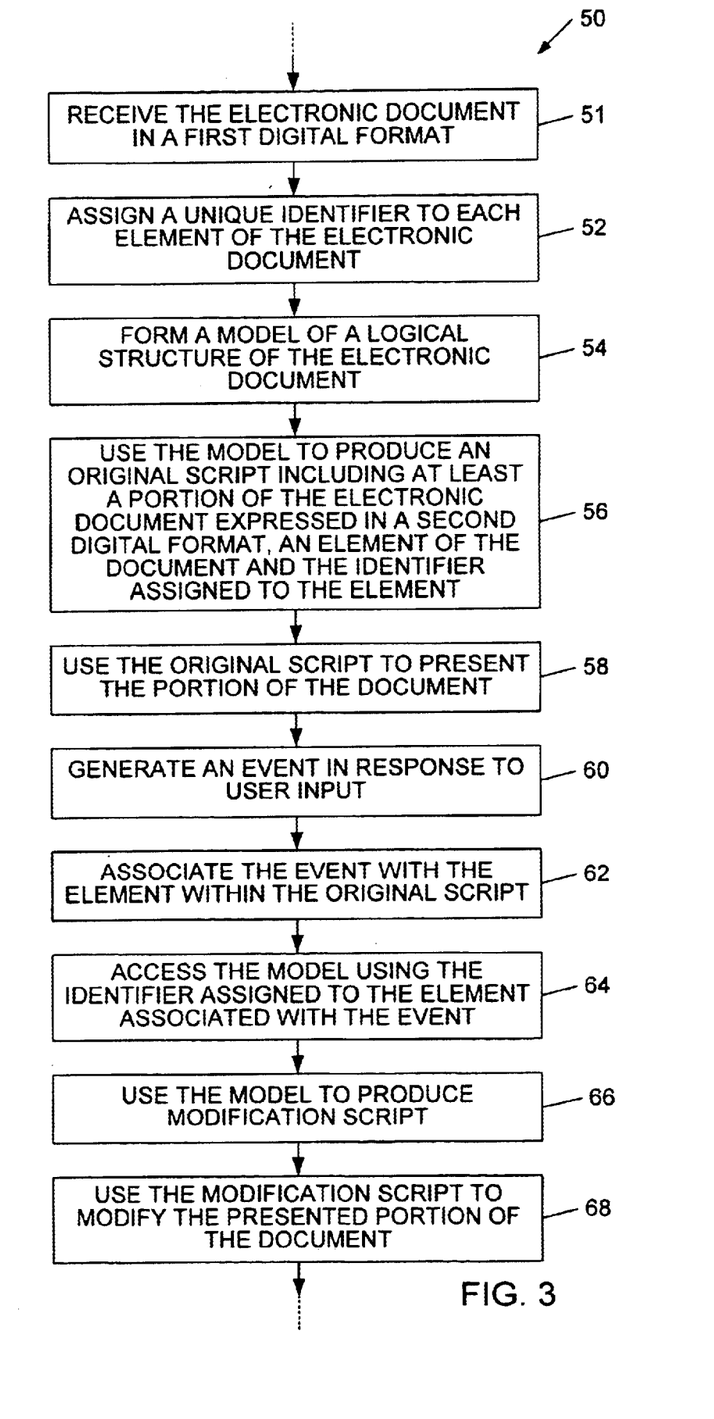
FIG. 3 is a flow chart of one embodiment of a method for presenting an electronic document.

FIG. 3 is a flow chart of one embodiment of a method 50 for presenting an electronic document. The electronic document may be, for example, an "interactive" document wherein a presentation of the document (e.g., visual or audible) is dependent upon user input. During a step 51, the electronic document is received in a first digital format (e.g., HTML or XML). A unique identifier is assigned to each element of the electronic document during a step 52. During a step 54, a model of a logical structure is formed of the electronic document. The model may be, for example, a DOM (e.g., pre-transcoded DOM 38 in FIG. 2). During a step 56, the model is used to produce the original script including at least a portion of the electronic document expressed in a second digital format (e.g., a scripting language). The original script includes the elements within the portion of the electronic document, along with the identifiers assigned to the elements.

The original script is used to present the portion of the document during a step 58. During a step 60, an event is generated in response to user input. The event is associated with an element of the document during a step 62. During a step 64, the model is accessed using the identifier assigned to the element associated with the event. The model may be modified in response to the event and the identifier. Following any modification, the model is used to produce modification script during a step 66. During a step 68, the modification script is used to modify the presented document.

In system 20 of FIG. 2, steps 51, 52, 54, 56, 64, and 66 of method 50 may be embodied within transcoder proxy 28, and steps 58, 60, 62, and 68 may be embodied within client machine 22.

It is noted that in step 58 of method 50, the portion of the document may be presented in any number of ways, including audible form (e.g., speech) or tactile form via a Braille display.

Figure 4:
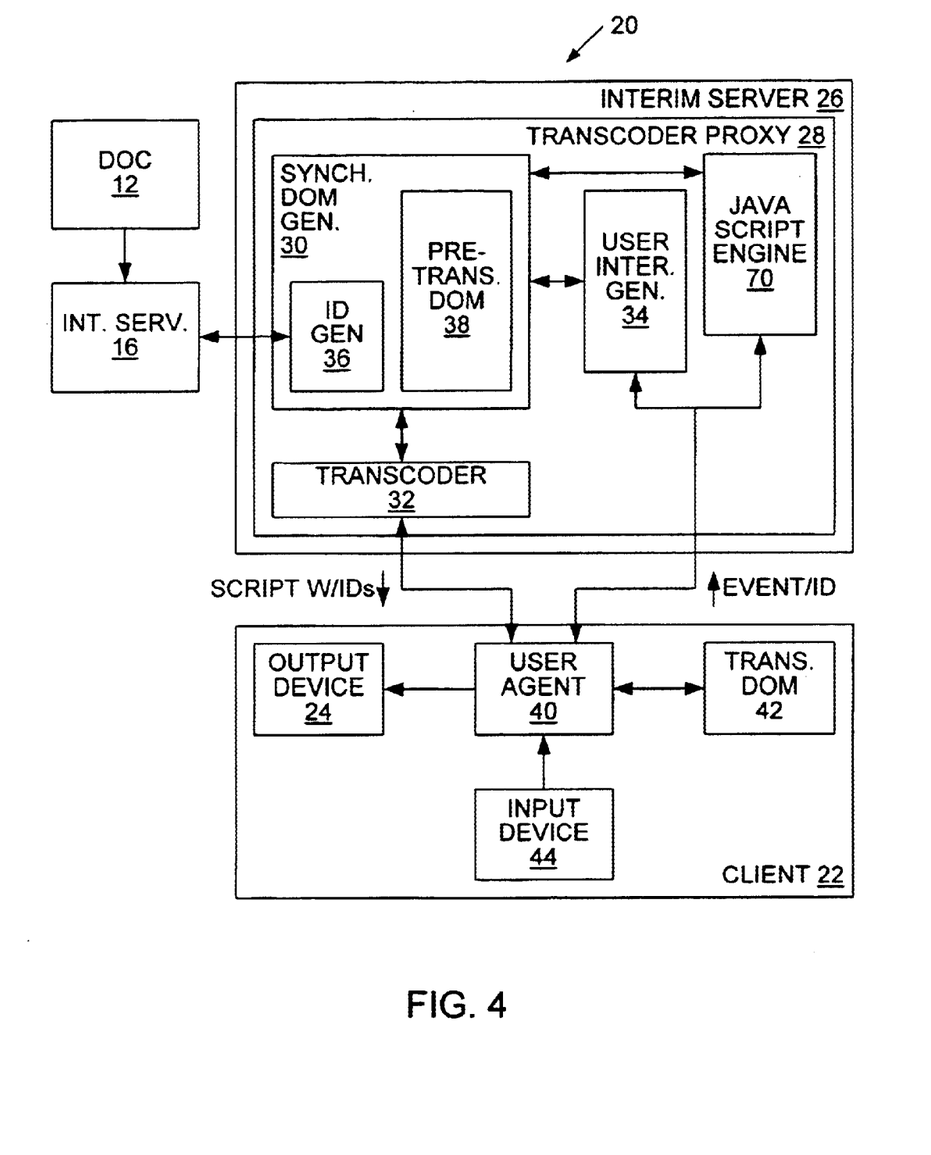
FIG. 4 is a block diagram of a second embodiment of the system of FIG. 2, wherein the system includes a JAVASCRIPT engine in order to provide interactive JAVASCRIPT support.

FIG. 4 is a block diagram of a second embodiment of system 20 for providing electronic document 12 (e.g., a Web page) to a client machine 22. In the embodiment of FIG. 4, transcoder proxy 28 includes a JAVASCRIPT engine 70 coupled in parallel with user interface generator 34 between user agent 40 of client machine 22 and synchronous DOM generator 30. JAVASCRIPT is a cross-platform, object-based scripting language for client and server applications. The inclusion of JAVASCRIPT engine 70 within transcoder proxy 28 reduces client machine 22 resource requirements to support interactive documents including JAVASCRIPT, allowing electronic documents displayed or otherwise presented by client machine 22 to be modified in response to JAVASCRIPT events within the electronic document.

For example, a "mouseover" is a JAVASCRIPT event which may be used to trigger a change in a displayed element (e.g., a graphic) when the cursor or pointer is passed over the displayed element using a mouse. Mouseover events (i.e., mouseovers) are widely used in navigation bars, pop-up boxes, and forms. Document 12 may include an element with JAVASCRIPT code which displays data when a mouseover event occurs (i.e., "onmouseover" data). The JAVASCRIPT mouseover event is thus associated with the element. In the embodiment of FIG. 4, the script produced by transcoder 32 and provided to user agent 40 of client machine 22 includes the element and the identifier assigned to the element.

The script may also include a code value for the mouseover event. The code value may be associated with the element within the script. User agent 40 may use the code value to associate the mouseover event with the element.

User agent 40 generates the mouseover event when the user passes the cursor or pointer over the displayed element using the mouse. User agent 40 associates the mouseover event with the displayed element, and provides mouseover event information and the identifier assigned to the element to user interface generator 34 and JAVASCRIPT engine 70 within transcoder proxy 28. The mouseover event information may include the code value of the mouseover event. User interface generator 34 may not recognize the mouseover event information, and may not respond to the mouseover event.

On the other hand, JAVASCRIPT engine 70 may recognize the mouseover event information and respond to the mouseover event by accessing the element associated with the mouseover event within pre-transcoded DOM 38 using the identifier. JAVASCRIPT engine 70 may use the code value to access the JAVASCRIPT code of the element. JAVASCRIPT engine 70 executes the JAVASCRIPT code of the element, thus producing the onmouseover data. JAVASCRIPT engine 70 may provide the onmouseover data to synchronous DOM generator 30. Synchronous DOM generator 30 may use pre-transcoded DOM 38 and the onmouseover data to produce a modified portion (e.g., a second portion) of document 12. Synchronous DOM generator 70 may provide the second portion of document 12, including the "onmouseover" data to transcoder 32.

Transcoder 32 translates the second portion of document 12 from the first digital format to the second digital format, thereby producing modification script including the onmouseover data. The modification script thus includes a description of the elements and the identifier assigned to each of the elements within the second portion of document 12 to be displayed or otherwise presented by client machine 22 as a result of the mouseover event. In response to the modification script, user agent 40 of client machine 22 modifies transcoded DOM 42 and issues new output commands to output device 24. As a result, the second portion of document 12 is displayed or otherwise presented by output device 24.

Figure 5:
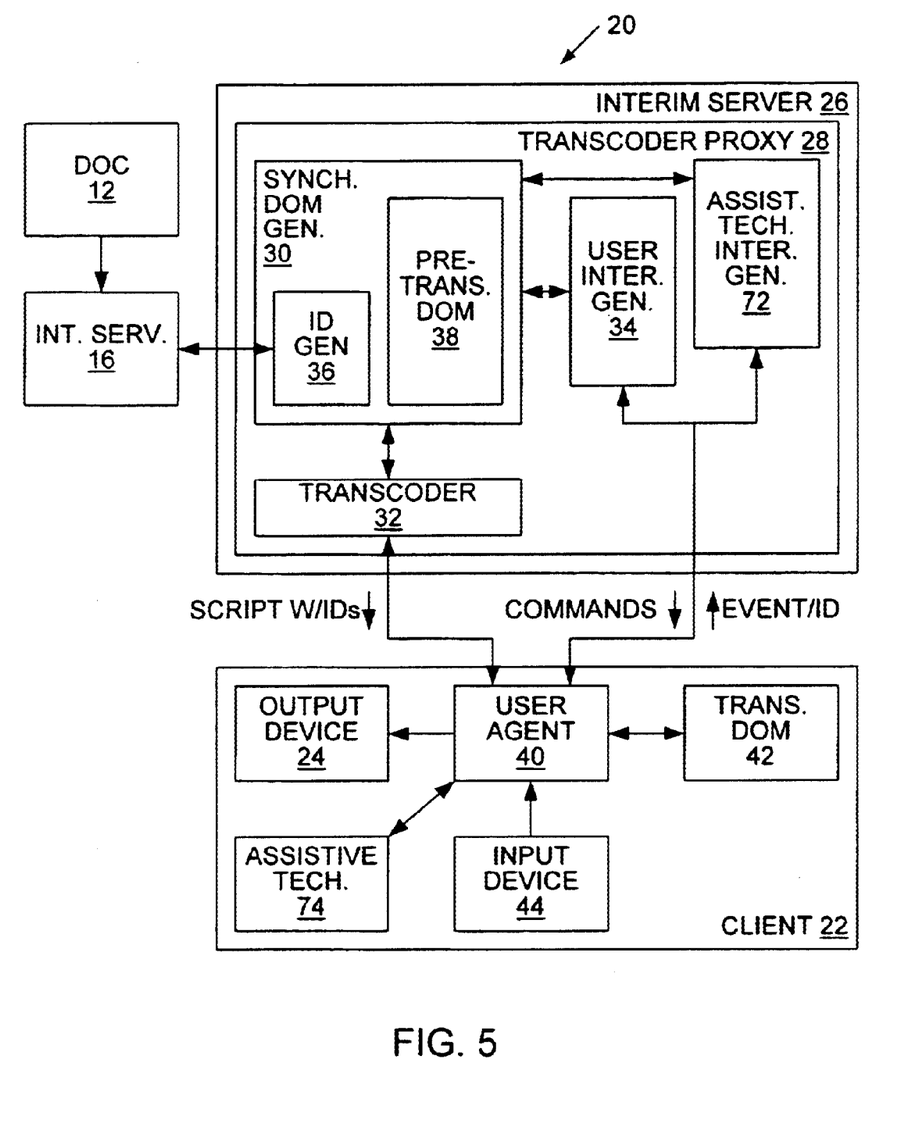
FIG. 5 is a block diagram of a third embodiment of the system of FIG. 2, wherein the system includes additional elements to provide assistive technology support.

FIG. 5 is a block diagram of a third embodiment of system 20 for providing electronic document 12 (e.g., a Web page) to a client machine 22. In the embodiment of FIG. 5, transcoder proxy 28 includes an assistive technology interface generator 72 coupled in parallel with user interface generator 34 between user agent 40 of client machine 22 and synchronous DOM generator 30. In addition, client machine 22 includes an assistive technology 74 coupled to user agent 40. Assistive technology 74 may provide an interface between user agent 40 and, for example, a device such as a Braille display or a speech engine which converts digital signals representing text to speech and/or converts speech to digital signals representing text. In the embodiment of FIG. 5, user agent 40 uses transcoded DOM 42 to issue output commands to assistive technology 74. In response to the output commands, assistive technology 74 may produce commands for a device coupled to assistive technology 74.

Common Braille displays include a linear array of output cells (e.g., 40, 66, or 80 cells). Each cell has either six pins, arranged two pins wide by three pins high, or eight pins arranged two pins wide by four pins high. Pins of a given cell are raised such that they extend from vertical holes to form patterns representing, for example, letters, numbers, punctuation, and/or Braille composition signs. Common Braille displays also include keys or buttons for user input which allow a user to navigate through an electronic document (e.g., a Web document).

A Braille display may be coupled to assistive technology 74. In this case, a user may press a "next line" button on the Braille display in order for a next line of document 12 to be presented. Assistive technology 74 may provide a signal to user agent 40 indicating that the "next line" button was pressed. User agent 40 may generate an "assistive technology" event in response. User agent 40 may associate the assistive technology event with an element, and may provide assistive technology event information and the identifier assigned to the element associated with the event to user interface generator 34 and assistive technology interface generator 72 within transcoder proxy 28. The assistive technology event information may include a code value assigned to the "next line" assistive technology event. User interface generator 34 may not recognize the assistive technology event information, and may not respond to the assistive technology event.

On the other hand, assistive technology interface generator 72 may recognize the assistive technology event information and respond to the assistive technology event. Assistive technology interface generator 72 may use the assistive technology event information and the identifier to produce DOM access commands, and may provide the DOM access commands to synchronous DOM generator 30. Synchronous DOM generator 30 may use the DOM access commands to access one or more elements within pre-transcoded DOM 38. Synchronous DOM generator 30 may modify pre-transcoded DOM 38 in response to the DOM access commands.

Alternately, assistive technology interface generator 72 may use the identifier associated with the element to access the one or more elements within pre-transcoded DOM 38. Assistive technology interface generator 72 may modify pre-transcoded DOM 38 in response to the assistive technology event information and the identifier.

In either case, following any modification of pre-transcoded DOM 38, synchronous DOM generator 30 provides the requested next line portion of document 12 to transcoder 32. Transcoder 32 translates the next line portion of document 12 from the first digital format to the second digital format, thereby producing modification script. The modification script thus includes a description of the elements and the identifier assigned to each of the elements within the next line portion of document 12 to be provided to the Braille display via assistive technology 74 as a result of the assistive technology event. In response to the modification script, user agent 40 of client machine 22 modifies transcoded DOM 42 and issues new output commands to assistive technology 74 and/or output device 24. Assistive technology 74 may use the output commands to produce Braille display commands, and provide the Braille display commands to the Braille device. As a result, the next line portion of document 12 is displayed by the Braille device. The next line portion of document 12 may also be displayed or otherwise presented by output device 24.

Where assistive technology 74 is a screen reader, the user may, for example, press a "next line" button in order for a "next line" portion of document 12 to be presented. Assistive technology may provide one or more signals to user agent 40 indicating that the "next line" button was pressed. User agent 40 may generate an assistive technology event in response, associate the assistive technology event with an element, and provide assistive technology event information and the identifier assigned to the element to user interface generator 34 and assistive technology interface generator 72. User interface generator 34 may not recognize the assistive technology event information, and may not respond to the assistive technology event. On the other hand, assistive technology interface generator 72 may recognize and respond to the assistive technology event as described above.

Assistive technology 74 within client machine 22 may cooperate with assistive technology interface generator 72 within transcoder proxy 28. For example, where assistive technology 74 may be a screen reader, and the user may press a button into order to make the screen reader "talk faster". In response, assistive technology 74 may produce "talk faster" request signals, and may provide the "talk faster" request signals to user agent 40. User agent 40 may forward the "talk faster" request signals to assistive technology interface generator 72. Assistive technology interface generator 72 may respond to the "talk faster" request signals by producing one or more commands which, when executed by assistive technology 74, cause the screen reader to produce speech at a faster rate. Assistive technology interface generator may provide the commands to assistive technology 74 via user agent 40.

In the embodiment of FIG. 5, an assistive technology solution is divided between assistive technology 74 located within client machine 22 and assistive technology interface generator 72 located within interim server 16. The inclusion of assistive technology interface generator 72 within interim server 26 reduces client machine 22 resource requirements to support the assistive technology solution, allowing the assistive technology solution to include a client machine with limited capabilities which may otherwise preclude the assistive technology solution.

In other embodiments of system 20, transcoder proxy 28 may be located within client machine 22. In such cases, transcoder proxy 28 may not be technically a "proxy", but simply a transcoder. For example, client machine 22 may be a desktop computer system including a transcoder performing the functions of transcoder proxy 28 as described above.

It will be appreciated by those skilled in the art having the benefit of this disclosure that this invention is believed to be an electronic document delivery system which allows a client machine with limited resources to provide interactive aspects of electronic documents such as Web pages and/or an assistive technology solution for a physically challenged user. It is intended that the following claims be interpreted to embrace all such modifications and changes and, accordingly, the specification and drawings are to be regarded in an illustrative rather than a restrictive sense.

What is claimed is:

1. A system for delivering an electronic document, comprising:
    a transcoder proxy coupled to receive the electronic document in a first digital format, wherein the electronic document includes an element, and wherein the transcoder proxy is configured to:
        assign a unique identifier to the element;
        produce an original script that includes: (i) at least a portion of the electronic document expressed in a second digital format, and (ii) the element and the identifier assigned to the element; and
    a client machine coupled to receive the original script and configured to:
        use the original script to present the portion of the electronic document;
        receive a modification script, which is produced by the transcoder proxy in response to an event generated at the client machine; and
        use the modification script to modify the presented portion of the electronic document.

2. The system as recited in claim 1, wherein the transcoder proxy is further configured to store the element and the identifier assigned to the element for future use.

3. The system as recited in claim 1, wherein the first digital format is a text-based markup language.

4. The system as recited in claim 3, wherein the text-based markup language is hypertext markup language (HTML) or extensible markup language (XML).

5. The system as recited in claim 1, wherein the second digital format is a scripting language.

6. The system as recited in claim 1, wherein the transcoder proxy is further configured to:
    form a model of a logical structure of the electronic document;
    use the model to produce the original script; and
    provide the original script.

7. The system as recited in claim 6, wherein the model also defines methods for accessing and manipulating the document.

8. The system as recited in claim 7, wherein the model is a document object model (DOM).

9. The system as recited in claim 6, wherein the client machine is further configured to:
generate the event in response to user input;
associate the event with the element within the original script; and
provide the event and the identifier assigned to the element associated with the event to the transcoder proxy.

10. The system as recited in claim 9, wherein elements of the electronic document are associated with corresponding identifiers within the model, and wherein in response to the event and the identifier provided by the client machine, the transcoder proxy is configured to:
access the model using the identifier;
use the model to produce the modification script, wherein the modification script differs from the original script; and
provide the modification script to the client machine.

11. A system for delivering an electronic document, comprising:
a transcoder proxy coupled to receive the electronic document in a first digital format, wherein the electronic document includes at least one element, and wherein the transcoder proxy is configured to:
assign a unique identifier to each element of the electronic document;
form a model of a logical structure of the electronic document;
use the model to produce an original script, wherein the original script includes at least a portion of the electronic document expressed in a second digital format, and wherein the original script includes at least one element and the identifier assigned to the element; and
provide the original script; and
a client machine coupled to receive the original script, wherein the client machine is configured to:
use the original script to present the portion of the electronic document; and
receive a modification script, which is produced by the transcoder proxy in response to an event generated at the client machine, and use the modification script to modify the presented portion of the electronic document.

12. The system as recited in claim 11, wherein the client machine is further configured to:
generate the event in response to user input;
associate the event with the element within the original script; and
provide the event and the identifier assigned to the element associated with the event to the transcoder proxy.

13. The system as recited in claim 12, wherein the model is a document object model (DOM).

14. The system as recited in claim 11, wherein the model also defines methods for accessing and manipulating the document.

15. The system as recited in claim 11, wherein the first digital format is a text-based markup language.

16. The system as recited in claim 15, wherein the text-based markup language is hypertext markup language (HTML) or extensible markup language (XML).

17. The system as recited in claim 11, wherein elements of the electronic document are associated with corresponding identifiers within the model, and wherein in response to the event and the identifier provided by the client machine, the transcoder proxy is configured to:
access the model using the identifier;
use the model to produce the modification script, wherein the modification script differs from the original script; and
provide the modification script to the client machine.

18. A transcoder proxy, comprising:
a synchronous document object model (DOM) generator adapted to receive an electronic document in a first digital format, wherein the electronic document includes at least one element, and wherein the synchronous DOM generator comprises an identifier (ID) generator configured to assign a unique identifier to each element, and wherein the synchronous DOM generator is configured to:
form a pre-transcoded DOM representing a logical structure of the electronic document, wherein elements are associated with corresponding identifiers within the pre-transcoded DOM; and
provide a first portion of the electronic document in the first digital format; and
a transcoder coupled to receive the portion of the electronic document in the first digital format and configured to:
translate the first portion of the electronic document from the first digital format to an original script in a second digital format, wherein the original script includes a element and the identifier assigned to the element;
provide the original script to a client machine coupled to the transcoder for presenting the first portion of the electronic document;
generate a modification script in response to user input at the client machine; and
provide the modification script to the client machine for modifying the presented portion of the electronic document.

19. The transcoder as recited in claim 18, wherein the synchronous DOM generator is further configured to:
receive DOM commands;
access the pre-transcoded DOM using the DOM access commands; and
provide a second portion of the electronic document in the first digital format.

20. The transcoder as recited in claim 19, wherein the transcoder is further configured to:
receive the second portion of the electronic document in the first digital format; and
translate the second portion of the electronic document from the first digital format to the modification script in the second digital format.

21. The transcoder proxy as recited in claim 18, wherein the first digital format is a text-based markup language.

22. The transcoder proxy as recited in claim 21, wherein the text-based markup language is hypertext markup language (HTML) or extensible markup language (XML).

23. A system for delivering in electronic document, comprising:
a transcoder proxy, including:
a synchronous document object model (DOM) generator coupled to receive the electronic document in a first digital format, wherein the electronic document includes at least one element, and wherein the synchronous DOM generator comprises an identifier (ID) generator configured to assign a unique identifier to each element, and wherein the synchronous DOM generator is configured to:

form a pre-transcoded DOM representing a logical structure of the electronic document, wherein elements are associated with corresponding identifiers within the pre-transcoded DOM;

provide a portion of the electronic document in the first digital format; and a transcoder coupled to receive the portion of the electronic document in the first digital format and configured to:

translate the portion of the electronic document from the first digital format to an original script in a second digital format, wherein the original script includes an element and the identifier assigned to the element; and     provide the original script; and a client machine coupled to receive the original script, wherein the client machine comprises:

an output device;

a user agent coupled to the output device and the transcoder, wherein the user agent is configured to:

form a transcoded DOM in response to the original script from the transcoder, wherein the transcoded DOM is a representation of the portion of the electronic document;

use the transcoded DOM to produce output commands; and         provide the output commands to the output device.

24. The system as recited in claim 23, wherein the client machine is further configured to:

generate an event in response to user input;

associate the event with the element within the original script;

provide the event and the identifier assigned to the element associated with the event to a user interface generator coupled within the transcoder proxy; and modify the transcoded DOM in response to a modification script received from the user interface generator.

25. A method for presenting an electronic document, comprising:

receiving the electronic document in a first digital format;

assigning a unique identifier to each element of the electronic document;

forming a model of a logical structure of the electronic document, wherein elements are associated with corresponding identifiers within the model;

using the model to produce an original script, wherein the original script includes at least a portion of the electronic document expressed in a second digital format, and wherein the original script includes at least one element and the identifier assigned to the at least one element;

providing the original script for use in presenting the portion of the electronic document;

receiving an event and an identifier associated with the event;

accessing the model using the identifier associated with the event;

using the model to produce a modification script, wherein the modification script differs from the original script; and providing the modification script for use in modifying the presented portion of the electronic document.

26. The method as recited in claim 25, wherein the model also defines methods for accessing and manipulating the document.

27. The method as recited in claim 25, wherein the model is a document object model (DOM).

28. The method as recited in claim 25, wherein the first digital format is a text-based markup language.

29. The method as recited in claim 25, wherein the second digital format is a scripting language.

30. A method for presenting an electronic document, comprising:

receiving the electronic document in a first digital format;

assigning a unique identifier to each element of the electronic document;

forming a model of a logical structure of the electronic document, wherein elements are associated with corresponding identifiers within the model;

using the model to produce an original script, wherein the original script includes at least a portion of the electronic document expressed in a second digital format, and wherein the original script includes an element of the document and an identifier assigned to the element;

using the original script to present the portion of the document;

generating an event in response to user input;

associating the event with the element within the original script;

accessing the model using the identifier;

using the model to produce modification script; and using the modification script to modify the presented portion of the document.

* * * * *

UNITED STATES PATENT AND TRADEMARK OFFICE
CERTIFICATE OF CORRECTION

PATENT NO.    : 6,829,746 B1
DATED         : December 7, 2004
INVENTOR(S)   : Schwerdtfeger et al.

It is certified that error appears in the above-identified patent and that said Letters Patent is hereby corrected as shown below:

Column 14,
Line 60, please delete "in" and substitute therefor -- an --.

Signed and Sealed this

Eleventh Day of October, 2005

JON W. DUDAS
*Director of the United States Patent and Trademark Office*